United States Patent [19]

Seiler et al.

[11] 4,261,889
[45] Apr. 14, 1981

[54] REACTIVE DYESTUFFS, THEIR MANUFACTURE AND USE

[75] Inventors: Herbert Seiler, Riehen; Gert Hegar, Schönenbuch, both of Switzerland

[73] Assignee: Ciba-Geigy Corp., Ardsley, N.Y.

[21] Appl. No.: 953,049

[22] Filed: Oct. 19, 1978

Related U.S. Application Data

[63] Continuation of Ser. No. 855,091, Nov. 25, 1977, abandoned, which is a continuation of Ser. No. 773,993, Mar. 3, 1977, abandoned, which is a continuation of Ser. No. 642,046, Dec. 18, 1975, abandoned.

[30] Foreign Application Priority Data

Dec. 18, 1974 [CH] Switzerland .................. 16893/74

[51] Int. Cl.³ .................................. C09B 29/22
[52] U.S. Cl. ........................... 260/153; 260/146 T; 260/242.2; 544/189; 544/204; 544/208; 542/460; 542/425
[58] Field of Search ........................................ 260/153

[56] References Cited

U.S. PATENT DOCUMENTS

| | | | |
|---|---|---|---|
| 3,966,705 | 6/1976 | Oesterlin et al. | 260/153 |
| 4,066,389 | 1/1978 | Riat et al. | 260/153 |
| 4,115,378 | 9/1978 | Bien et al. | 260/153 X |

FOREIGN PATENT DOCUMENTS 1188606  4/1970  United Kingdom .................. 260/153

Primary Examiner—Helen M. S. Sneed
Attorney, Agent, or Firm—Sprung, Felfe, Horn, Lynch & Kramer

[57] ABSTRACT

Dyestuffs of the formula

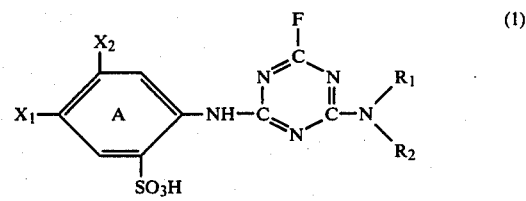

wherein $R_1$ is hydrogen or a low-molecular alkyl group, $R_2$ is hydrogen, a low-molecular alkyl group, an aryl radical or the radical of an organic dyestuff containing sulpho groups, and $R_1$ and $R_2$ together with the nitrogen atom can form a ring, $X_1$ and $X_2$ are hydrogen, a sulpho group or the —N=N—K radical, wherein K is the radical of a coupling component and, if one X is the —N=N—K radical, the other X is a sulpho group, and the benzene ring A can contain further substituents.

24 Claims, No Drawings

REACTIVE DYESTUFFS, THEIR MANUFACTURE AND USE

This is a continuation of application Ser. No. 855,091 filed Nov. 25, 1977 (now abandoned) which is, in turn a continuation of application Ser. No. 773,993 filed Mar. 3, 1977 (now abandoned) which is a continuation of application Ser. No. 642,046 filed Dec. 18, 1975 (now abandoned).

The invention relates to dyestuffs of the formula

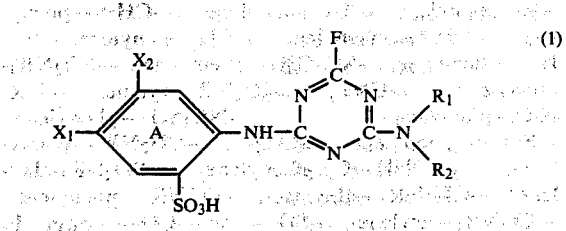

wherein $R_1$ denotes hydrogen or a low-molecular alkyl group and $R_2$ denotes hydrogen, a low-molecular alkyl group, an aryl radical or the radical of an organic dyestuff, containing sulpho groups, of the monoazo or polyazo, metal complex, phthalocyanine, anthraquinone, stilbene, oxazine, dioxazine, triphenylmethane, nitro or azomethine series, and the radicals $R_1$ and $R_2$ together with the nitrogen atom can optionally form a ring with at most 6 carbon atoms, which can be interrupted by further hetero-atoms such as —O— or —S—.

In the formula (1), $X_1$ and $X_2$ denote hydrogen, a sulpho group or the —N=N—K radical, wherein K is the radical of a coupling component of the benzene, naphthalene, acetoacetic acid arylide or heterocyclic series, with the condition that when one X denotes the —N=N—K radical, the other X is a —SO$_3$H group. In addition to the sulpho group and the radicals X, the phenyl nucleus A can carry yet further substituents, such as, for example, methyl or ethyl groups, methoxy or ethoxy groups, halogen atoms such as, for example, chlorine, and carboxylic acid groups.

If $R_2$ is an aryl radical without dyestuff character, it denotes, in particular, a benzene or naphthalene radical which is substituted by low-molecular alkyl groups, sulphonic acid groups or carboxylic acid groups or which carries substituents which permit a further diazotisation and/or coupling, such as, for example, an amino or hydroxyl group, or a heterocyclic ring, such as, for example, a pyrazolone ring.

The dyestuffs according to the invention are manufactured by first reacting an amine of the formula

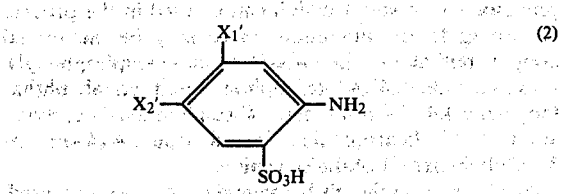

wherein $X_1'$ and $X_2'$ denote hydrogen, a primary amino group or a sulpho group, with the proviso that whenever one $X'$ is an amino group, the other $X'$ represents a sulpho group, with 2,4,6-trifluoro-1,3,5-triazine, then condensing the resulting condensation product with a compound of the formula

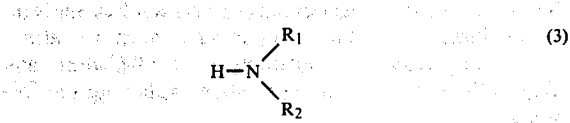

wherein $R_1$ and $R_2$ have the meaning indicated when explaining the formula (1), and, where necessary, carrying out a diazotisation and/or coupling, to obtain the dyestuff.

As amines of the formula (2) there may be mentioned aniline-2-sulphonic acid, aniline-2,4- or -2,5-disulphonic acid, 4-aminotoluene-3-sulphonic acid, 3-aminotoluene-4-sulphonic acid, 2-amino-4- or -5-chlorobenzenesulphonic acid, 4-aminoanisole-3-sulphonic acid, 4-amino-3-sulphobenzoic acid, 1,3-phenylenediamine-4,6-disulphonic acid, 1,4-phenylenediamine-2,5-disulphonic acid and 4-amino-1,3-xylene-5-sulphonic acid.

As compounds of the formula (3) there may be mentioned:

(a) Aliphatic and aromatic monoamines

Ammonia, methylamine, dimethylamine or diethylamine, monoethanolamine and diethanolamine, 3-methoxypropylamine, morpholine, piperidine, hydrazine, N-methylhydrazine, aniline, N-methylaniline, 2-, 3- or 4-methylaniline, 2-, 3- or 4-aminobenzoic acid, metanilic acid, sulphanilic acid, 2-aminotoluene-5-sulphonic acid, 2-amino-4-chlorotoluene, 5-aminosalicylic acid, 2-amino-4- or 5-sulphobenzoic acid and naphthylamine-monosulphonic, -disulphonic and -trisulphonic acids.

(b) Diamines 1,3-Phenylenediamine-4-sulphonic acid, 1,4-phenylenediamine-2-sulphonic acid, 2,4-diaminotoluene-5-sulphonic acid and 2,5-diaminotoluene-3-sulphonic acid.

(c) Compounds capable of coupling 6- or 7-Amino-1-naphthol-3-sulphonic acid, 6-methylamino-1-naphthol-3-sulphonic acid, 8-amino-1-naphthol-3,5- or -3,6-disulphonic acid, 1-(4'-aminophenyl)-3-methyl-5-pyrazolone, 1-(4'- or 5'-amino-2-sulphophenyl)-3-methyl-5-pyrazolone and 1-(4'-aminophenyl)-5-pyrazolone-3-carboxylic acid.

(d) Dyestuffs containing amino groups

1. Azo dyestuffs

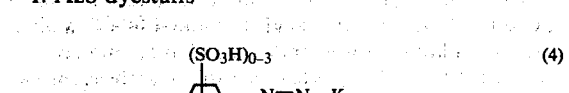

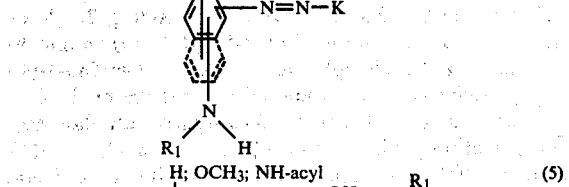

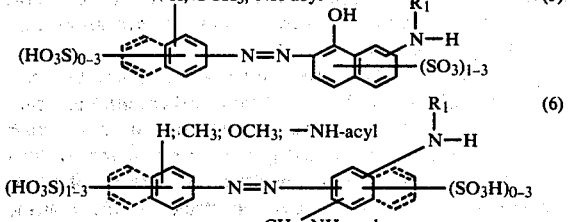

In the abovementioned formulae, K denotes the radical of a coupling component of the benzene, naphthalene or heterocyclic series, acyl denotes a low-molecular aliphatic acyl radical containing at most 3 C atoms or an aromatic radical containing at most 8 C atoms and $R_1$ has the meaning indicated when explaining the formula (1).

2. Metal complex azo dyestuffs

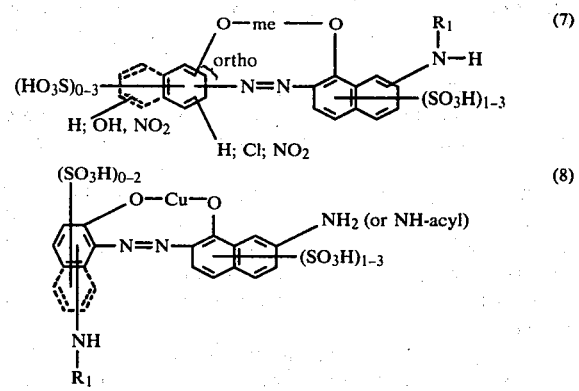

wherein $R_1$ and acyl have the meaning indicated when explaining the formulae (4), (5) and (6) and Me represents Cu, Cr or Co.

3. Anthraquinone dyestuffs

The following may be mentioned as examples of dyestuff stuff compounds of the *anthraquinone series* which can be used as starting materials in the process according to the invention: anthraquinone compounds which contain a group of the formula —NHR, defined above, bonded to an alkylamino or arylamino group, which itself is bonded to the α-position of the anthraquinone nucleus. As examples of such anthraquinone compounds there may be mentioned: 1-amino-4-(4'-aminoaniline)-anthraquinone-2,3'-disulphonic acid and the corresponding 2,3',5-, 2,3',6- and 2,3',7-trisulphonic acids, 1-amino-4-(4''-amino-4'-benzoylaminoaniline)-anthraquinone-2,3-disulphonic acid and the corresponding -2,3',5-trisulphonic acid, 1-amino-4-[4'-(4''-aminophenylazo)-anilino]-anthraquinone-2,2'',5-trisulphonic acid, 1-amino-4-(4'-amino-3'-carboxyanilino)-anthraquinone-2,5-disulphonic acid, 1-amino-4-(3'-aminoanilino)-anthraquinone-2,4',5-trisulphonic acid and the corresponding 2,4-disulphonic acid, 1-amino-4-[4'-(4''-aminophenyl)-anilino]-anthraquinone-2,3'',5-trisulphonic acid, 1-amino-4(4'-methylamino)-anilinoanthraquinone-2,3'-disulphonic acid and the corresponding 2,3',5-trisulphonic acid, 1-amino-4-(4'-n-butylamino)-anilinoanthraquinone-2,3'-disulphonic acid, 1-amino-4-(4'-methylamino-3'-carboxyanilino)-anthraquinone-2-sulphonic acid, 1-amino-4(3'-β-hydroxyethylamino)-anilinoanthraquinone-2,5-disulphonic acid, 1-(4'-aminoanilino)-anthraquinone-2,3'-disulphonic acid and 1-amino-4-(4'-amino-2'-methoxyanilino)-anthraquinone-2,3-disulphonic acid.

Such dyestuff compounds of the anthraquinone series can themselves be obtained from anthraquinone compounds which contain a halogen atom or a nitro group bonded to the corresponding α-position of the anthraquinone nucleus, or from the leuco derivative of a 1,4-dihydro-, -diamino- or -aminohydroxy-anthraquinone by reacting the corresponding anthraquinone compound with at least one molar proportion of an aliphatic or aromatic diamine.

4. Phthalocyanine dyestuffs

Dyestuff compounds of the *phthalocyanine series,* which can be used in the process according to the invention, are preferably metal-containing phthalocyanines, such as copper phthalocyanines, which contain at least one group which confers solubility in water, such as a sulphonic acid group, and at least one group of the formula —NHR, as defined above. The —NHR group or groups can be bonded directly or via a divalent bridge to the benzene rings of the phthalocyanine nucleus, for example via a -phenylene-, —CO—phenylene-, —SO$_2$-phenylene-, —NH—phenylene-, —S—phenylene, —O—phenylene-, —CH$_2$S—phenylene-, —CH$_2$O—phenylene-, —CH$_2$-phenylene, —SCH$_2$—phenylene-, —SO$_2$CH$_2$—phenylene-, —SO$_2$NR$_1$-phenylene-, —CH$_2$-, —SO$_2$NR$_1$-arylene, —NR$_1$CO—phenylene-, —NR$_1$SO$_2$—phenylene-, —SO$_2$O—phenylene-, —CH$_2$—, —CH$_2$NR$_1$—phenylene-, —CH$_2$NH—CO-phenylene-, —SO$_2$NR$_1$-alkylene-, —CH$_2$NR$_1$—alkylene-, —CONR$_1$—phenylene-, —CONR$_1$—arylene-, —SO$_2$— or —CO— bridge. In the abovementioned divalent bridge members, $R_1$ denotes hydroen, alkyl or cycloalkyl, arylene denotes a divalent aromatic radical which is optionally substituted, for example by halogen, alkyl or alkoxy and wherein the terminal bonds may be bonded to identical or different nuclei, and alkylene denotes a divalent aliphatic radical which can include hetero-atoms, such as nitrogen, in the chain of atoms, for example the radical —CH$_2$CH$_2$—NH—CH$_2$CH$_2$—.

As examples of such divalent aromatic radicals, which are referred to as arylene, there may be mentioned: aromatic nuclei, for example a benzene, naphthalene, acridine and carbazole nucleus, which can carry further substituents, and radicals of the formula

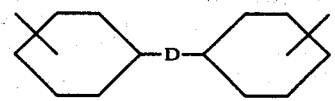

wherein the benzene rings can carry further substituents and —D— denotes a bridging group, for example —CH=CH—, —NH—, —S—, —O—, —SO$_2$—, —NO=N—, —N=N—, —NH—CO—NH—CO—NH—, —O—CH$_2$CH$_2$O— or

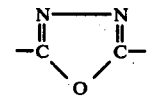

As specific examples of dyestuff compounds of the phthalocyanine series which can be used in the process according to the invention, there may be mentioned copper phthalocyanine-4-N-(4-amino-3-sulphophenyl)-sulphonamide-4',4'',4'''-trisulphonic acid, cobalt phthalocyanine-4,4'-di-N-(4'-amino-4'-sulphophenyl)-carboxamide-4'',4'''-dicarboxylic acid and copper 4-(4'-amino-3'-sulphobenzoyl)-phthalocyanine.

Mixtures of aminophthalocyanines can also be used. For example, a mixture of approximately equal parts of copper phthalocyanine-N-(4-amino-3-sulphophenyl)-sulphonamide-tri-sulphonic acid and copper phthalocyanine-di-N-(4-amino-3-sulphophenyl)-sulphonamide-disulphonic acid can be used.

The aminophthalocyanines containing a sulphonic acid can be obtained either by sulphonation of known phthalocyanines containing primary or secondary amino groups or by synthesis from mixtures of phthalic acid derivatives and sulphonated phthalic acid derivatives. Sulphonating agents used are, for example, oleum, for example of 20% strength solution of sulphur trioxide in sulphuric acid. Furthermore, they can be obtained by warming together suitable derivatives of sulphonated phthalic acid and substituted phthalic acids in accordance with the generally known processes, for example by warming together a mixture of 4-sulphophthalic anhydride and 4-p-nitrobenzoylphthalic anhydride, urea, copper(II) chloride and ammonium molybdate in o-dichlorobenzene at about 150° C. Phthalocyanines which are used as starting materials can also be manufactured by sulphonation of the corresponding primary and secondary amines or by reaction of a primary (or secondary N-alkyl- or -cycloalkyl)-nitroaniline with a phthalocyanine which contains chloromethyl groups and sulphonic acid groups or carboxylic acid groups. Furthermore, such aminophthalocyanines can also be manufactured by reaction of a phthalocyanine, which contains chlorosulphonyl groups, with a monoacetylalkylenediamine or an amino-N-benzylacetamide in the presence of water and treatment of the product thus obtained (which contains both sulphonamide groups and sulphonic acid groups) with aqueous alkali to hydrolyse the acetylamino group, or by reaction of a phthalocyanine, which contains chloromethyl groups and sulphonic acid groups or carboxylic acid groups, with a monoacetylalkylenediamine, and treatment of the product thus obtained with aqueous alkali to hydrolyse the acetylamino groups. Furthermore such products can be obtained by direct sulphonation or by warming together a mixture of suitable carboxyl or sulphophthalic acid derivatives with substituted phthalic acid derivatives, for example by warming the anhydrides with urea and a catalyst, in an organic solvent, and reduction of the resulting nitrophthalocyaninesulphonic acid or -carboxylic acid or hydrolysis of the resulting acylaminophthalocyaninesulphonic acid or -carboxylic acid, or by reaction of a phthalocyanine compound, which contains carboxylic acid chloride groups, with a diaminobenzenesulphonic acid or -carboxylic acid, an aminobenzenesulphonic acid or an aminobenzoic acid, which also contains a nitro group, and reduction of the nitro compound thus obtained, or, finally, by reaction of a phthalocyanine compound, which contains carboxylic acid chloride groups, with a N-aminobenzylacetamide, and subsequent hydrolysis of the product thus obtained with aqueous alkali.

5. Nitro dyestuffs

Dyestuff compounds of the *nitro series*, which can be used in the process according to the invention, are preferably those of the formula

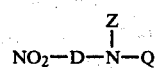

wherein D denotes a naphthalene or benzene nucleus which can be substituted further, the nitrogen atom N is in the ortho-position to the nitro group, Z denotes hydrogen or an optionally substituted hydrocarbon radical and Q denotes hydrogen or an organic radical bonded to the nitrogen by a carbon atom, and wherein Q and Z are not both hydrogen, and Q can be bonded to Z, if Z is a hydrocarbon radical, or can be bonded to D in the ortho-position to the nitrogen atom N, to form a heterocyclic ring, and which contain at least one group of the formula —NHR, as defined above.

As special examples of dyestuff compounds, containing at least one -NHR group, which can be used as starting materials in the process according to the invention, the compounds of the following categories may be mentioned:

1. Monoazo compounds of the formula

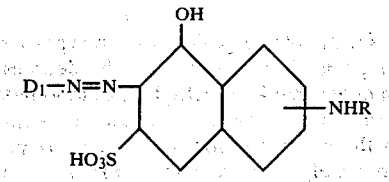

wherein $D_1$ denotes an at most bicyclic aryl radical which is free from azo groups and —NHR groups and the —NHR group is preferably bonded to the 6-, 7- or 8-position of the naphthalene nucleus, and which compounds can contain a sulphonic acid group in the 5- or 6-position of the naphthalene nucleus.

$D_1$ can denote a radical of the naphthalene or benzene series which does not contain an azo substituent, for example a stilbene, diphenyl, benzthiazolylphenyl or diphenylamine radical. In this category, there should also be noted the related dyestuffs in which the -NHR group, instead of being bonded to the naphthalene nucleus, is bonded to a benzoylamino or anilino group which is bonded to the 6-, 7- or 8-position of the naphthalene nucleus.

Particularly valuable starting dyestuffs are those wherein $D_1$ denotes a sulphonated phenyl or naphthyl radical, especially those which contain a —$SO_3H$ group in the ortho-position to the azo bond; the phenyl radical can be substituted further, for example by halogen atoms, such as chlorine, alkyl radicals, such as methyl, acylamino groups, such as acetylamino, and alkoxy radicals, such as methoxy.

2. Disazo compounds of the above formula, wherein $D_1$ denotes a radical of the azobenzene, azonaphthalene or phenylazonaphthalene series and the naphthalene nucleus is substituted by the -NHR group and, if desired, by sulphonic acid, as in category 1.

3. Monoazo compounds of the formula

wherein $D_1$ denotes an at most bicyclic aryl radical, as described in category 1, and preferably a disulphonaphthyl radical or stilbene radical, and the benzene nucleus can contain further substituents, such as halogen atoms or alkyl, alkoxy, carboxylic acid and acylamino groups.

4. Monoazo or disazo compounds of the formula

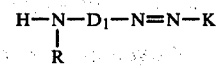

wherein $D_1$ denotes an arylene radical, such as a radical of the azobenzene, azonaphthalene or phenylazonaphthalene series or, preferably, an at most bicyclic arylene radical of the benzene or naphthalene series and K denotes the radical of a naphtholsulphonic acid or the radical of an enolised or enolisable ketomethylene compound (such as an acetoacetarylide or a 5-pyrazolone) with the OH group in the ortho-position to the azo group. $D_1$ preferably denotes a radical of the benzene series, which contains a sulphonic acid group.

5. Monoazo or disazo compounds of the formula $$D_1-N\}N-K_2-NHR$$

wherein $D_1$ denotes a radical of the types defined for $D_1$ in categories 1 and 2 above and $K_2$ denotes the radical of an enolisable ketomethylene compound, (such as an acetoacetarylide or a 5-pyrazolone) with the OH group in the ortho-position to the azo group.

6. The metal complex compounds, for example the copper complexes, chromium complexes and cobalt complexes, of the dyestuffs of the indicated formulae, wherein $D_1$, K and $K_2$ each have the meanings indicated and furthermore a metallisable group (for example a hydroxyl, lower alkoxy or carboxylic acid group) is present in the ortho-position to the azo group in $D_1$.

7. Anthraquinone compounds of the formula

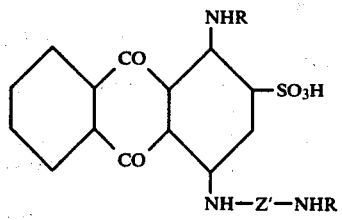

wherein the anthraquinone nucleus can contain an additional sulphonic acid group in the 5-, 6-, 7- or 8-position and Z' denotes a bridge member which is preferably a divalent radical of the benzene series, for example a phenylene, diphenylene of 4,4'-stilbene or -azobenzene radical. Preferably, Z' should contain a sulphonic acid group for each benzene ring present. 8. Phthalocyanine compounds of the formula

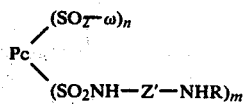

wherein Pc denotes a phthalocyanine nucleus, preferably copper phthalocyanine, ω denotes —OH and/or —$NH_2$, Z' denotes a bridge member, preferably an aliphatic, cycloaliphatic or aromatic bridge, and n and m each denote 1, 2 or 3 and can be identical or different, provided that n+m is not greater than 4.

9. Nitro dyestuffs of the formula

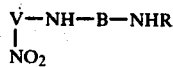

wherein V and B denote monocyclic aryl nuclei and the nitro group in V is in the ortho-position to the NH group.

In the categories of dyestuffs mentioned, the following are examples of possible starting dyestuffs: In category 1:

6-Amino-1-hydroxy-2-(2'-sulphophenylazo)-naphthalene-3-sulphonic acid, 6-methylamino-1-hydroxy-2-(4'-acetylamino-2'-sulphophenylazo)-naphthalene-3-sulphonic acid, 8-amino-1-hydroxy-2-(2'-sulphophenylazo)-naphthalene-3,6-disulphonic acid, 8-amino-1-hydroxy-2-(4'-chloro-2'-sulphophenylazo)-naphthalene-3,5-disulphonic acid, 7-amino-2-(2',5'-disulphophenylazo)-1-hydroxynaphthalene-3-sulphonic acid, 7-methylamino-2-(2'-sulphophenylazo)-1-hydroxynaphthalene-3-sulphonic acid, 7-methylamino-2-(4'-methoxy-2'-sulphophenylazo)-1-hydroxynaphthalene-3-sulphonic acid, 8-(3'-aminobenzoylamino)-1-hydroxy-2-(2'-sulphophenylazo)-naphthalene-3,6-disulphonic acid, 8-amino-1-hydroxy-2,2'-azonaphthalene-1',3',5',6-tetrasulphonic acid, 8-amino-1-hydroxy-2,2'-azaonaphthalene-1',3,5'-trisulphonic acid, 6-amino-1-hydroxy-2,2'-azonaphthalene-1',3,5'-trisulphonic acid, 6-methylamino-1-hydroxy-2,2'-azonaphthalene-1',3,5'-trisulphonic acid, 7-amino-1hydroxy-2,2'-azonaphthalene-1',3-disulphonic acid, 8-amino-1-hydroxy-2-(4'-hydroxy-3'-carboxyphenylazo)-naphthalene-3,6-disulphonic acid and 6-amino-1-hydroxy-2-(4'-hydroxy-3'-carboxyphenylazo)-naphthalene-3,5-disulphonic acid.

In category 2:

8-Amino-1-hydroxy-2-[4'-(2''-sulphophenylazo)-2'-methoxy-5'-methylphenylazo]-naphthalene-3,6-disulphonic acid, 8-amino-1-hydroxy-2-[4'-(4''-methoxyphenylazo)-2'-carboxy-phenylazo]-naphthalene-3,6-disulphonic acid, 8-amino-1-hydroxy-2-[4'-(2''-hydroxy-3'',6''-disulpho-1''-naphthylazo)-2'-carboxyphenylazo]-naphthalene-3,6-disulphonic acid, 4,4'-bis-(8''-amino-1''-hydroxy-3'',6''-disulpho-2''-naphthylazo)-3,3'-dimethoxydiphenyl and 6-amino-1-hydroxy-2-[4'-(2''-sulphophenylazo)-2'-methoxy-5'-methylphenylazo]-naphthalene-3,5-disulphonic acid.

In category 3:

2-(4'-Amino-2'-methylphenylazo)-naphthalene-4,8-disulphonic acid, 2-(4'-amino-2'-acetylaminophenylazo)-naphthalene-5,7-disulphonic acid, 4-nitro-4'-(4''-methylaminophenylazo)-stilbene-2,2'-disulphonic acid, 4-nitro-4'-(4''-amino-2''-methyl-5''-methoxyphenylazo)-stilbene-2,2'-disulphonic acid, 4-amino-4'-(4''-methoxyphenylazo)-stilbene-2,2'-disulphonic acid, and 4-amino-2-methylazobenzene-2',5'-disulphonic acid.

In category 4:

1-(2',5'-Dichloro-4'-sulphophenyl)-3-methyl-4-(3''-amino-4''-sulphophenylazo)-5-pyrazolone, 1-(4'-sulphophenyl)-3-carboxy-4-(4'-amino-3''-sulphophenylazo)-5-pyrazolone, 1-(2'-methyl-5'-sulphonphenyl)-3-methyl-4-(4''-amino-3''-sulphophenylazo)-5-pyrazolone, 1-(2'-sulphophenyl)-3-methyl-4-(3''-amino-4''-sulphophenylazo)-5-pyrazolone, 4-amino-4''-(3''-methyl-1''-phenyl-4''-pyrazol-5''-onylazo)-stilbene-2,2'-disulphonic acid, 4-amino-4'-(2''-hydroxy-3'',6''-disulpho-1''-naphthylazo)-stilbene-2,2'-disulphonic acid, 8-acetylamino-1-hydroxy-2-(3'-amino-4'-sulphophenylazo)-naphthalene-3,6-disulphonic acid, 7-(3'-sulphophenylamino)-1-hydroxy-2-(4'-amino-2'-carboxyphenylazo)-naphthalene- 3-sulphonic acid, 8-phenylamino-1-hydroxy-2-(4''-amino2'-sulphophenylazo)-naphthalene-3,6-disulphonic acid and 6-acetylamino-1-hydroxy-2-(5'-amino-2'-sulphophenylazo)-naphthalene-3-sulphonic acid.

In category 5:

1-(3'-Aminophenyl)-3-methyl-4-(2',5'-disulphophenylazo)-5-pyrazolone, 1-(3'-aminophenyl)-3-carboxy-4-(2'-carboxy-4'-sulphophenylazo)-5-pyrazolone, 4-amino-4'-[3''-methyl-4''-(2''',5'''-disulphophenylazo)-

1″-pyrazol-5″-onyl]-stilbene-2,2′-disulphonic acid and 1-(3′-aminophenyl)-3-carboxy-4-[4″-(2′″,5′″-disulphophenylazo)-2″-methoxy-5″-methylphenylazo[-5-pyrazolone.

In category 6:

The copper complex of 8-amino-1-hydroxy-2-(2′-hydroxy-5″-sulphophenylazo)-naphthalene-3,6-disulphonic acid, the copper complex of 6-amino-1-hydroxy-2-(2′-hydroxy-5′-sulphophenylazo)-naphthalene-3-sulphonic acid, the copper complex of 6-amino-1-hydroxy-2-(2′-hydroxy-5′-sulphophenylazo)-naphthalene-3,5-disulphonic acid, the copper complex of 8-amino-1-hydroxy-2-(2′-hdyroxy-3′-chloro-5′-sulphophenylazo)-naphthalene-3,6-disulphonic acid, the copper complex of 6-methyamino-1-hydroxy-2-(2′-carboxy-5′-sulphophenylazo)-naphthalene-3-sulphonic acid, the copper complex of 8-amino-1-hydroxy-2-[4′-(2″-sulphophenylazo)-2′-methoxy-5′-methylphenylazo]-naphthalene-3,6-disulponic acid, the copper complex of 6-amino-1-hydroxy-2-[4′-(2″,5″-disulphophenylazo)-2′-methoxy-5′-methylphenylazo]-naphthalene-3,5-disulphonic acid, the copper complex of 1-(3′-amino-4′-sulphophenyl)-3-methyl-4-[4″-(2′″,5′″-disulphophenylazo)-2″-methoxy-5″-methylphenylazo]-5-pyrazolone, the copper complex of 7-(4′-amino-3′-sulphoanilino)-1-hydroxy-2-[″-(2′″,5′″-disulphophenylazo)-2″-methoxy-5″-methylphenylazo]-naphthalene-3-sulphonic acid, the copper complex of 6-(4′-amino-3′-sulphoanilino)-1-hydroxy-2-(2″-carboxyphenylazo)-naphthalene-3-sulphonic acid, the 1,2-chromium complex of 7-amino-6′-nitro-1,2′-dihydroxy-2,1′-azonaphthalene-3,4′-disulphonic acid, the 1,2-chromium complex of 6-amino-1-hydroxy-2-(2′-carboxyphenylazo)-naphthalene-3-sulphonic acid, the 1,2-chromium complex of 8-amino-1-hydroxy-2-(4′-nitro-2′-hydroxyphenylazo)-naphthalene-3,6-disulphonic acid, the 1,2-cobalt complex of 6-(4′-amino-3′-sulphoanilino)-1-hydroxy-2-(5″-chloro-2″-hydroxyphenylazo)-naphthalene-3-sulphonic acid, the 1,2-chromium complex of 1-(3′-amino-4′-sulphophenyl)-3-methyl-4-(2″-hydroxy-4″-sulpho-1″-naphthylazo)-5-pyrazolone, the 1,2-chromium complex of 7-(4′-sulphoanilino)-1-hydroxy-2-(4″-amino-2″-carboxyphenylazo)-naphthalene-3-sulphonic acid and the 1,2-chromium complex of 1-(3′-aminophenyl)-3-methyl-4-(4″-nitro-2″-carboxyphenylazo)-5-pyrazolone.

In category 7:

1-Amino-4-(3′-amino-4′-sulphoanilino)-anthraquinone-2-sulphonic acid, 1-amino-4-(4′-amino-3′-sulphoaniline-anthraquinone-2,5-disulphonic acid, 1-amino-4-[4′-amino3′-sulphophenyl)-anilino]-anthraquinone-2,5-disuphonic acid, 1-amino-4-[4′-(4″-amino2″-sulphophenylazo)-anilino]-anthraquinone-2,5-disulphuric acid and 1-amino-4-(4′-methylamino-3-sulphoanilino)-anthraquinone-2-sulphonic acid.

In category 8:

3-(3′-Amino-4′-sulphophenyl)-sulphamyl copper phthalocyanine-tri-3-sulphonic acid, di-4-(3′-amino-4′-sulphophenyl)-sulphamyl copper phthalocyanine-di-4-sulphonic acid and 3-(3′-aminophenylsulphamyl)-3-sulphamyl copper phthalocyanine-di-3-sulphonic acid.

In category 9:

4-Amino-2′-nitro-diphenylamine-3,4′-disulphonic acid.

The following may be mentioned as examples of intermediate products of the formula

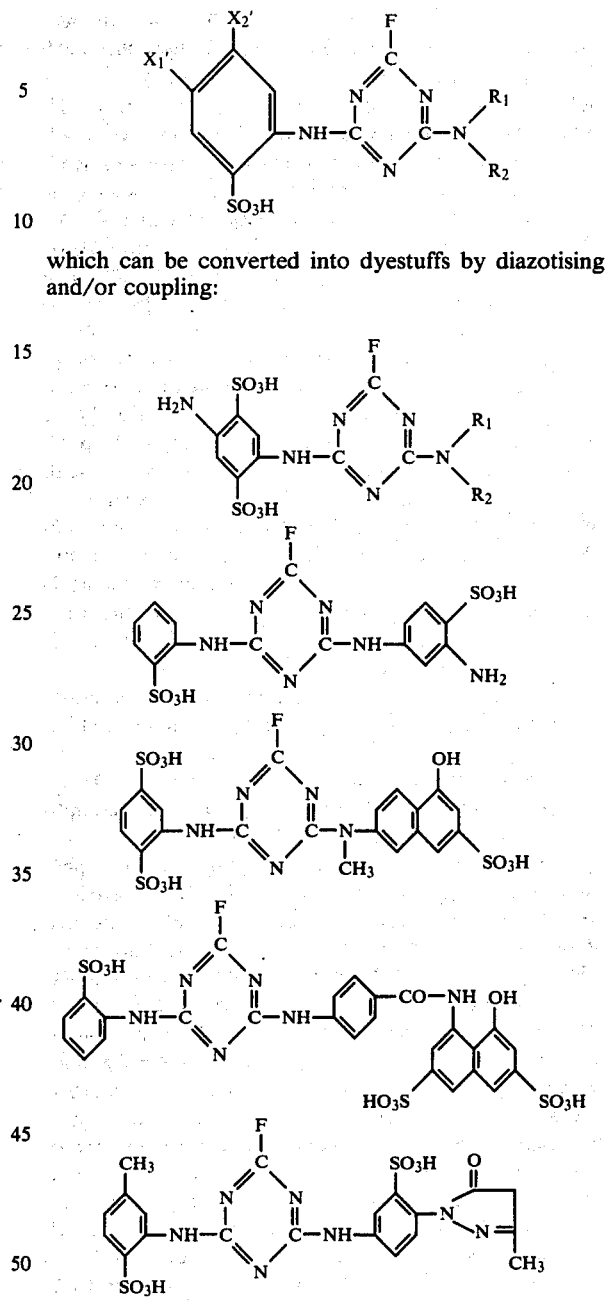

which can be converted into dyestuffs by diazotising and/or coupling:

The following may be mentioned as examples of aromatic primary amines which can be diazotised and coupled with the intermediate products which are capable of coupling: aniline, o-, m- and p-toluidines, o-, m- and p-anisidines, o-, m- and p-chloroanilines, 2,5-dichloroaniline, α- and β-naphthylamine, 2,5-dimethylaniline, 5-nitro-2-aminoanisole, 4-aminodiphenyl, aniline-2,3- and 4-carboxylic acids, 2-aminodiphenyl ether, 2-, 3- or 4-aminobenzenesulphonamide or -sulphonic acid monomethylamides or -monoethylamides or -dimethylamides or -diethylamides, dehydrothio-p-toluidinemonosulphonic acid or dehydrothio-p-toluidinesulphonic acid, aniline-2-, -3- and -4-sulphonic acids, aniline-2,5-disulphonic acid, 2,4-dimethylaniline-6-sulphonic acid, 3-aminobenzotrifluoride-4-sulphonic acid, 4-chloro-5-methylaniline-2-sulphonic acid, 5- chloro-4-methylaniline-2-sulphonic acid, 3-acetylaminoaniline-6-sulphonic acid, 4-acetylaminoaniline-2-sulphonic acid, 4-chloroaniline-2-sulphonic acid, 3,4-dichloroaniline-6-sulphonic acid, 4-methylaniline-2-sulphonic acid, 3-methylaniline-6-sulphonic acid, 2,4-dimethoxyaniline-6-sulphonic acid, 4-methoxyaniline-2-sulphonic acid and 5-methoxyaniline-2-sulphonic acid, 2,5-dichloroaniline-4-sulphonic acid, 2-naphthylamine-4,8- and -6,8-disulphonic acid, 1-naphthylamine-2-, -4-, -5-, -6- or -6- or -7- monosulphonic acid, 1-naphthylamine-3,6-disulphonic acid, 2-naphthylamine-3,6- and -5,7-disulphonic acid, 2-naphthylamine-3,6,8-trisulphonic acid, m- and p-nitroaniline, 4-nitroaniline-2-sulphinic acid, 3-nitroaniline-6-sulphonic acid, m- or p-aminoacetanilide and 4-amino-2-acetylaminotoluene-5-sulphonic acid, 2-aminonaphthalene-5,7-disulphonic acid, 1-amino-8-hydroxynaphthalene-4-sulphonic acid, 1-amino-8-hydroxynaphthalene-3,6-disulphonic acid, 6-acetylamino-2-aminonaphthalene-4,8-disulphonic acid, 2-aminonaphthalene-1,7-disulphonic acid, 2-aminonaphthalene-1,5-disulphonic acid, 2-aminonaphthalene-1,5,7-trisulphonic acid, 2-aminonaphthalene-1-sulphonic acid, 1-aminonaphthalene-3,7-disulphonic acid, 2-aminoaphthalene-4,6,8-trisulphonic acid, 1-aminonaphthalene-2,4,7-trisulphonic acid, 1-aminonaphthalene-2,5,7-trisulphonic acid, 1-amino-5-acetylaminonaphthalene-3,7-disulphonic acid and 2-aminonaphthalene-3,7-disulphonic acid.

Examples of suitable coupling components K-H are 3-cresol, phenol-4-sulphonic acid, β-naphthol, 2-naphthol-6- or -7-sulphonic acid, 2-naphthol-3,6- or -6,8-disulphonic acid, 1-naphthol-4-sulphonic acid, 1-phenyl-3-methyl-5-pyrazolone, 1-(4'-sulphophenyl)-3-methyl-5-pyrazolone, 1-(2',5'-dichloro4'-sulphophenyl)-3-methyl-5-pyrazolone, 3-aminocarbonyl-4-methyl-6-hydroxypyridone-2, 1-ethyl-3-cyano- or -3-chloro-4-methyl-6-hydroxypyridone-2, 1-ethyl-3-sulphomethyl-4-methyl-6-hydroxypyridone-2, 2,4,6-triamino-3-cyanopyridine, 2-(3'-sulphophenylamino)-4,6-diamino-3-cyanopyridine, 2-(2'-hydroxyethylamino)-3-cyano-4-methyl-6-aminopyridine, 2,6-bis-(2'-1 -hydroxyethylamino)-3-cyano-4-methylpyridine, 2-benzoylamino-5-naphthol-7-sulphonic acid, 1-benzoylamino-8-naphthol-3,6- or -4,6-disulphonic acid, phenol, p-cresol, acetoacetanilide and acetoacet-2-methoxyaniline-5-sulphonic acid, 1-(4'-sulphophenyl)-5-pyrazolone-3-carboxylic acid, 3-methyl-5-pyrazolone, 4-hydroxy-2-quinolone, 8-acetylamino-1-naphthol-3-sulphonic acid, 2-aminonaphthalene-5,7-disulphonic acid and 1-naphthol-4,6- or -4,7-disulphonic acid.

The dyestuffs and dyestuff intermediates according to the invention are preferably manufactured in aqueous solution or suspension, at a low temperature and at a weakly acid, neutral or weakly alkaline pH value. Advantageously, the hydrogen fluoride liberated during the condensation is continuously neutralised by adding aqueous alkali metal hydroxides, alkali metal carbonates or alkali metal bicarbonates. The diazotisation of the intermediates which contain a diazotisable amino group is as a rule carried out by treatment with nitrous acid in an aqueous mineral acid solution at a low temperature whilst the coupling is carried out at weakly acid, neutral or weakly alkaline pH values.

Compared to dyestuffs which do not contain a sulpho group in the ortho-position to the amino group on the triazine ring, the dyestuffs according to the invention are distinguished by a higher reactivity.

They can be used for dyeing and printing a great diversity of materials, such as silk, leather, wool, high molecular weight polyamide fibres and high molecular weight polyurethanes, but especially cellulosic materials of fibrous structure, such as linen, cellulose, regenerated cellulose and, above all, cotton. They can be used both in the exhaustion process and for dyeing by the pad-dyeing process, in which the goosds are impregnated but aqueous dyestuff solutions which optionally also contain salt, and the dyestuffs are fixed after an alkali treatment or in the presence of alkali, if appropriate whilst being subjected to heat.

The dyestuffs can also be used for printing, especially on cotton, but equally for printing nitrogen-containing fibres, for example wool, silk or blended fabrics containing wool.

It is advisable to rinse the dyeings and prints thoroughly with cold and hot water, if appropriate with addition of a dispersing agent which assists the diffusion of the nonfixed constituents.

In the examples which follow, parts denote parts by weight.

EXAMPLE 1

A neutral solution is prepared of 26.8 parts of 1,4-diaminobenzene-2,5-disulphonic acid in 200 parts by volume of water with addition of sodium hydroxide solution. 13.6 parts of 2,4,6-trifluoro-1,3,5-triazine are added dropwise at 0° C. over the course of 15 minutes and at the same time the pH value of the reaction mixture is kept at 6 by adding sodium hydroxide solution. After completion of the condensation, a solution of 19.5 parts of the sodium salt of 1-aminobenzene-3-sulphonic acid in 60 parts of water is added and the pH value is kept at between 6 and 7 simultaneous addition of sodium hydroxide solution. At the end, the temperature is 20° C. 7 parts of solid sodium nitrite are now added and after this has dissolved completely the reaction mixture is poured onto a mixture of 25 parts by volume of 10 N hydrochloric acid and 100 parts of crushed ice. A neutralised solution of 29 parts of 1-ethyl-3-sulphomethyl-4-methyl-6-hydroxy-2-pyridone-5-carboxylic acid amide in 100 parts of water is now poured into the diazo solution this obtained, the pH is adjusted to 7.5 and the mixture is stirred at this pH value until the coupling is complete. The dyestuff is precipitated by adding potassium chloride to the reaction mixture and is subsequently isolated by filtration. After drying and grinding, an orange dyestuff powder is obtained, which dyes cotton, from aqueous liquors, in deep slightly reddish-tinged yellow shades.

If, after completion of the condensation of 2,4,6-trifluoro-1,3,5-triazine with 1,4-diaminobenzene-2,5-disulphonic acid, the amines listed in Table 1 which follows are used in place of metanilic acid, and the coupling components mentioned are used in place of 1-ethyl-3-sulphomethyl-4-methyl-6-hydroxy-2-pyridone-5-carboxylic acid amide, further valuable dyestuffs are obtained, which give the stated shades on cellulose fibres.

TABLE 1

| No. | Amine | Coupling component | Colour shade on cellulose |
|---|---|---|---|
| 1 | Ammonia | 1-(4'-Sulphophenyl)-3-carboxy-5 pyrazolone | Yellow |
| 2 | N-Methylaniline | 1-(2',5'-Dichloro-4'-sulphophenyl)-3-methyl-5-pyrazolone | Yellow |
| 3 | 1-Amino-4-methylbenzene-3-sulphonic acid | 1-(4',8'-Disulphonaphth-2'-yl)-3-methyl-5-pyrazolone | Reddish-tinged yellow |
| 4 | 1-Amino-2-methylbenzene | 1-Ethyl-3-aminocarbonyl-4-methyl-6-hydroxy-2-pyridone | Yellow |
| 5 | 2-Amino-ethyl alcohol | 1-Ethyl-3-aminocarbonyl-4-methyl-6-hydroxy-2-pyridone | Yellow |
| 6 | 1-Aminobenzene-4-sulphonic acid | 3-Aminocarbonyl-4-sulphomethyl-2,6-dihydroxypyridine | Yellow |
| 7 | 4-Amino-benzyl-1-sulphonic acid | 2-(3'-Sulphophenylamino)-4,6-diamino-3-cyanopyridine | Red |
| 8 | 2-Amino-ethanesulphonic acid | 1-Hydroxynaphthalene-4-sulphonic acid | Bluish-tinged red |
| 9 | Morpholine | 1-Hydroxynaphthalene-4,6-disulphonic acid | Red |
| 10 | Diethylamine | 2-Hydroxynaphthalene-6,8-disulphonic acid | Red |
| 11 | 2-Methylamino-ethanol sulphate | 2-Hydroxynaphthalene-6-sulphonic acid | Red |
| 12 | 1-Amino-4-acetylamino-benzene-3-sulphonic acid | 2-Acetylamino-5-hydroxynaphthalene-7-sulphonic acid | Yellowish-tinged red |
| 13 | 1-Amino-3-hydroxybenzene-4-carboxylic acid | 1-Acetylamino-8-hydroxynaphthalene-3,6-disulphonic acid | Bluish-tinged red |
| 14 | 2-Methylamino-ethane-sulphonic acid | 1-Benzoylamino-8-hydroxynaphthalene-4,6-disulphonic acid | Red |
| 15 | 2-Aminonaphthalene-4,8-disulphonic acid | 2-Acetylamino-8-hydroxynaphthalene-6-sulphonic acid | Red |
| 16 | Cyclohexylamine | [Copper complex azo dye structure] | Reddish-tinged blue |
| 17 | Dibutylamine | [Azo dye structure] | Blue |

EXAMPLE 2

A neutral solution is prepared of 17.3 parts of 1-aminobenzene-2-sulphonic acid in 100 parts of water with addition of sodium hydroxide solution. 13.5 parts of 2,4,6-trifluoro-1,3,5-triazine are added dropwise over the course of 15 minutes of 0° C., with good stirring. The pH value is kept at 5 to 6 by simultaneous dropwise addition of aqueous sodium bicarbonate solution. A solution of 27.5 parts of the sodium salt of 2-methylamino-5-hydroxynaphthalene-7-sulphonic acid is poured into the resulting suspension of the monocondensation product and condensation is carried out at 15° C. and a constant pH value of 6. At the same time, 17.3 parts of 1-aminobenzene-2-sulphonic acid are diazotised in the usual manner. The suspension of the diazo compound is allowed to run into the condensation product prepared above and the coupling is completed by adding aqueous sodium hydroxide solution until the pH value is 7. The dyestuff is isolated by sprinkling sodium chloride into the orange solution. After drying and grinding, an orange dyestuff powder is obtained, which dyes cotton, from aqueous solution, in brilliant orange shades.

Table 2 which follows contains further dyestuffs which are obtained by condensation of an o-sulphoaminobenzene with 2,4,6-trifluoro-1,3,5-triazine, subsequent condensation with a coupling component containing an amino group which can be acylated, and subsequent coupling with a diazo component. The last column contains the shade of the reactive dyeing obtained on cellulose materials.

TABLE 2

| No. | Aminosulphonic acid | Coupling component which can be acylated | Diazo Component | Colour shade on cellulose |
|---|---|---|---|---|
| 1 | 1-Aminobenzene-2-sulphonic acid | 1-(4'-Amino-2'-sulphophenyl)-3-methyl-5-pyrazolone | 1-Amino-4-ethoxy-benzene-2-sulphonic acid | Reddish-tinged yellow |
| 2 | 1-Amino-4-methoxy-benzene-2-sulphonic acid | 1-(3'-Aminophenyl)-3-carboxy-5-pyrazolone | 1-Aminobenzene-2,4-disulphonic acid | Yellow |
| 3 | 1-Amino-4-acetyl aminobenzene-2- | 2-Amino-5-hydroxynaphthalene-7-sulphonic acid | 1-Amino-4-methoxy-benzene-2- | Scarlet |

TABLE 2-continued

| No. | Aminosulphonic acid | Coupling component which can be acylated | Diazo Component | Colour shade on cellulose |
|---|---|---|---|---|
| | sulphonic acid | | sulphonic acid | |
| 4 | 1-Amino-4-methyl-benzene-2-sulphonic acid | 2-Amino-5-hydroxynaphthalene-7-sulphonic acid | 2-Aminonaphthalene-1,5-disulphonic acid | Orange |
| 5 | 1-Aminobenzene-2,5-disulphonic acid | 1-Amino-5-hydroxynaphthalene-7-sulphonic acid | 1-Amino-4-(2'-hydroxyethyloxy)-benzene-2-sulphonic acid | Orange |
| 6 | 1-Amino-4-methoxy-benzene-2-sulphonic acid | 2-Amino-5-hydroxynaphthalene-7-sulphonic acid | 2-Aminonaphthalene-3,6,8-trisulphonic acid | Scarlet |
| 7 | 1-Amino-4-methoxy-benzene-2,5-disulphonic acid | 2-Amino-8-hydroxynaphthalene-6-sulphonic acid | 1-Amino-4-methoxy-benzene-2-sulphonic acid | Red |
| 8 | 1-Aminobenzene-2,4-disulphonic acid | 1-(4'-Aminobenzoylamino)-8-hydroxynaphthalene-3,6-disulphonic acid | 2-Aminonaphthalene-1-sulphonic acid | Bluish-tinged red |
| 9 | 1-Amino-4-chloro-benzene-2-sulphonic acid | 1-(3'-Aminobenzoylamino)-8-hydroxynaphthalene-4,6-disulphonic acid | 1-Amino-4-methyl-benzene-2-sulphonic acid | Red |

EXAMPLE 3

25.3 parts of 1-aminobenzene-2,5-disulphonic acid are dissolved in 100 parts of water at pH 7 and condensed with 2,4,6-trifluoro-1,3,5-triazine in a similar manner to that in Example 2. An aqueous solution of 21 parts of the sodium salt of 1,3-diaminobenzene-4-sulphonic acid is added to the resulting solution of the monocondensate, and condensation is carried out at 15° C. and a pH value of 6.5, until no further diamine is detectable. The resulting condensation product, which still contains a diazotisable amino group, is now diazotised analogously to the instructions of Example 1. 40.5 parts of the disodium salt of 1-acetylamino-8-hydroxynaphthalene-3,6-disulphonic acid are added to the solution of the diazo compound and coupling is subsequently carried out at pH 7. to 7.5. On evaporating the whole reaction mixture, a red dyestuff powder is obtained, which dyes cotton in brilliant red shades.

Further dyestuffs, according to the invention can be prepared in a similar manner if 2,4,6-trifluoro-1,3,5-triazine is condensed, analogously to the procedure described above, first with an aminobenzenesulphonic acid from column 2 and subsequently with a diaminobenzenesulphonic acid from column 3 of Table 3 which follows. If the secondary reaction product thus obtained is diazotised and combined with the coupling component listed in column 4, reactive dyestuffs are obtained, which dye cellulose material in the shades indicated in column 5, which are fast to light and to wet treatments.

TABLE 3

| No. | Aminobenzenesulphonic acid | Diaminobenzenesulphonic acid | Coupling component | Colour shade on cellulose |
|---|---|---|---|---|
| 1 | 1-Aminobenzene-2-sulphonic acid | 1,4-Diaminobenzene-2-sulphonic acid | 1-(2',5'-Disulphophenyl)-3-methyl-5-pyrazolone | Reddish-tinged yellow |
| 2 | 1-Amino-4-methylbenzene-2-sulphonic acid | 1,3-Diaminobenzene-4-sulphonic acid | 1-Ethyl-3-sulphomethyl-4-methyl-6-hydroxy-2-pyridone | Yellow |
| 3 | 1-Amino-3-methylbenzene-6-sulphonic acid | 1,3-Diaminobenzene-4-sulphonic acid | 2-Aminonaphthalene-5,7-disulphonic acid | Orange |
| 4 | 1-Aminobenzene-2,4-disulphonic acid | 1,3-Diaminobenzene-4-sulphonic acid | 1-Hydroxynaphthalene-4-sulphonic acid | Scarlet |
| 5 | 1-Amino-4-methoxybenzene-2-sulphonic acid | 1,3-Diaminobenzene-4-sulphonic acid | 2-Hydroxynaphthalene-3,6-disulphonic acid | Orange |
| 6 | 1-Amino-4-carboxybenzene-2-sulphonic acid | 1,3-Diaminobenzene-4-sulphonic acid | 2-Sulphoacetylamino-hydroxynaphthalene-7-sulphonic acid | Orange |
| 7 | 1-Amino-4-methoxybenzene-2,5-disulphonic acid | 1,3-Diaminobenzene-4-sulphonic acid | 2-Acetylamino-8-hydroxynaphthalene-6-sulphonic acid | Yellowish-tinged red |
| 8 | 1-Aminobenzene-2,5-disulphonic acid | 1,3-Diaminobenzene-4-sulphonic acid | 1-Benzoylamino-8-hydroxynaphthalene-3,6-disulphonic acid | Bluish-tinged red |

TABLE 3-continued

| No. | Aminobenzenesulphonic acid | Diaminobenzene-sulphonic acid | Coupling component | Colour shade on cellulose |
|---|---|---|---|---|
| 9 | 1-Aminobenzene-2-sulphonic acid | 1,3-Diaminobenzene-4-sulphonic acid | [structure with Cu complex, HO3S, SO3H groups, N=N, Cu—O] | Reddish-tinged blue |
| 10 | 1-Amino-4-chlorobenzene-2-sulphonic acid | 1,3-Diaminobenzene-4-sulphonic acid | [structure with HO, NH2, HO3S, SO3H, N=N] | Blue |

EXAMPLE 4

17.3 parts of 1-aminobenzene-2-sulphonic acid are first condensed with 13.5 parts of 2,4,6-trifluoro-1,3,5-triazine as described in Example 2. A solution, adjusted to pH 8, of 126 parts of a phthalocyanine dyestuff of the formula

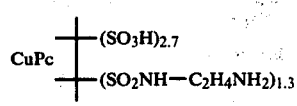

$$\text{CuPc}\begin{cases} (SO_3H)_{2.7} \\ (SO_2NH-C_2H_4NH_2)_{1.3} \end{cases}$$

(containing 1 mol of primary amino group in 1,260 g) is added to the suspension of the monocondensate, and condensation is carried out at 20° C. and a pH value of the reaction mixture of 7.5. After completion of the condensation, the dyestuff is precipitated by sprinkling sodium chloride into the mixture. After drying and grinding, a blue dyestuff powder is obtained, which dyes cotton in turquoise blue shades.

Analogously, acylation of the aminobenzenesulphonic acids listed in column 3 of Table 4 which follows, with 2,4,6-trifluoro-1,3,5-triazine, and condensation of the resulting acylaminobenzenesulphonic acids with the amino dyestuffs mentioned in column 2 gives further valuable reactive dyestuffs which dye cellulose material in the shades indicated in column 4.

In the table, the expression "saponified" or "reduced" means that an acylamino or nitro group contained in the aminoazo dyestuff has subsequently respectively been saponified or reduced, whereby the desired aminoazo dyestuff is formed.

TABLE 4

| No. | Amino dyestuff | Aminobenzene-sulphonic acid | Colour shade on cellulose |
|---|---|---|---|
| 1 | $\left[\text{Cu-Phthalocyanine}\begin{cases}(SO_3Na)_x \\ SO_2NH-\bigcirc-NH_2\end{cases}\right]_{4-x}$ $x \sim 2-3$ | 1-Aminobenzene-2-sulphonic acid | Turquoise blue |
| 2 | $\left[\text{Ni-Phthalocyanine}\begin{cases}(SO_3Na)_x \\ SO_2NH-\bigcirc-NH_2\end{cases}\right]_{4-x}$ $x \sim 2-3$ | 1-Aminobenzene-2,4-disulphonic acid | Turquoise blue |
| 3 | $\left[\text{Cu-Phthalocyanine}\begin{cases}(SO_3Na)_x \\ SO_2NH-\bigcirc(NH_2)(SO_3H)\end{cases}\right]_{4-x}$ $x \sim 2-3$ | 1-Amino-4-methylbenzene-2-sulphonic acid | Turquoise blue |
| 4 | $\left[\text{Cu-Phthalocyanine}\begin{cases}(SO_3Na)_x \\ SO_2NHCH_2CH_2NH_2\end{cases}\right]_{4-x}$ $x \sim 2-3$ | 1-Amino-4-methoxybenzene-2,5-disulphonic acid | Turquoise blue |
| 5 | 1-Amino-3-acetylaminobenzene-6-sulphonic acid ⟶ 1-(2',5'-disulphophenyl)-3-methyl-5-pyrazolone (saponified) | 1-Aminobenzene-2-sulphonic acid | Yellow |
| 6 | 1-Amino-3-acetylaminobenzene-6-sulphonic acid ⟶ 1-(4',8'-disulphonaphth-2'-yl)-3-methyl-5-pyrazolone (saponified) | 1-Aminobenzene-2,5-disulphonic acid | Yellow |

TABLE 4-continued

| No. | Amino dyestuff | Aminobenzene-sulphonic acid | Colour shade on cellulose |
|---|---|---|---|
| 7 | 1-Amino-3-nitrobenzene-6-sulphonic acid ⟶ 1-ethyl-3-sulphomethyl-4-methyl-6-hydroxy-2-pyridone (reduced) | 1-Amino-4-methoxy-benzene-2-sulphonic acid | Yellow |
| 8 | 1-Amino-3-acetylaminobenzene-6-sulphonic acid ⟶ 1-ethyl-3-aminocarbonyl-4-methyl-6-hydroxy-2-pyridone (saponified) | 1-Aminobenzene-2,5-disulphonic acid | Yellow |
| 9 | 1-Amino-3-acetylaminobenzene-6-sulphonic acid ⟶ 3-sulphomethyl-4-methyl-2,6-dihydroxy-pyridone (saponified) | 1-Amino-4-chloro-benzene-2-sulphonic acid | Yellow |
| 10 | 4-Amino-4'-nitrostilbene-2,2'-disulphonic acid ⟶ N-methylaniline | 1-Aminobenzene-2,4-disulphonic acid | Yellow |
| 11 | 2-Aminonaphthalene-4,8-disulphonic acid ⟶ 1-amino-3-acetylamino-benzene | 1-Aminobenzene-2-sulphonic acid | Yellow |
| 12 | 2-Aminonaphthalene-4,6,8-trisulphonic acid ⟶ 3-aminophenylurea | 1-Aminobenzene-2-sulphonic acid | Yellow |
| 13 | 1-Aminobenzene-2-sulphonic acid ⟶ 1-amino-5-hydroxynaphthalene-7-sulphonic acid | 1-amino-4-methoxy-benzene-2,5-disulphonic acid | Orange |
| 14 | 1-Amino-3-acetylaminobenzene-6-sulphonic acid ⟶ 1-hydroxynaphthalene-3,6-disulphonic acid (saponified) | 1-Amino-3-methyl-benzene-6-sulphonic acid | Reddish-tinged orange |
| 15 | 1-Aminonaphthalene-2,5,7-trisulphonic acid ⟶ 1-amino-2,5-dimethylbenzene ⟶ 1-naphthylamine-6-sulphonic acid | 1-Aminobenzene-2-sulphonic acid | Brown |
| 16 | 1-Amino-4-ethoxybenzene-2-sulphonic acid ⟶ 2-acetylamino-5-hydroxynaphthalene-7-sulphonic acid (saponified) | 1-Aminobenzene-2-sulphonic acid | Scarlet |
| 17 | 2-Aminonaphthalene-1,5-disulphonic acid ⟶ 1-(4'-nitrobenzoylamino)-8-hydroxynaphthalene-3,6-disulphonic acid (reduced) | 1-Aminobenzene-2-sulphonic acid | Red |
| 18 | 1-Amino-2-hydroxy-6-nitronaphthalene-4-sulphonic acid ⟶ 1-amino-8-hydroxynaphthalene-2,4-disulphonic acid (reduced) Cu complex | 1-Aminobenzene-2-sulphonic acid | Blue |
| 19 | 1-Hydroxy-2-amino-4-acetylaminobenzene-6-sulphonic acid ⟶ 1-amino-8-hydroxynaphthalene-2,4-disulphonic acid (saponified) Cu complex | 1-Aminobenzene-2,4-disulphonic acid | Blue |

EXAMPLE 5

6.8 parts of 2,4,6-trifluoro-1,3,5-triazine are added dropwise to a solution of 13.4 parts of 1,4-diaminobenzene-2,5-disulphonic acid in 200 parts by volume of water at 0° C. and a pH value of 4 to 5 is maintained by constantly neutralising the hydrogen fluoride liberated. The course of the reaction is followed chromatographically. The resulting solution of the intermediate product is condensed, at a pH value of 7 to 8 and at 10° to 20° C. with 31 parts of the aminoazo dyestuff obtained by coupling diazotised 1-aminobenzene-2-sulphonic acid with 1-(4'-nitrophenylamino)-8-hydroxynaphthalene-3,6-disulphonic acid and subsequently reducing the nitro group with sodium sulphide. The dyestuff is salted out completely with sodium chloride, filtered off, washed and again converted to a neutral solution in 500 parts by volume of water. Further diazotisation of the resulting aminoazo dyestuff and coupling with 15 parts of 1-hydroxynaphthalene-4,6-disulphonic acid gives the dyestuff of the formula

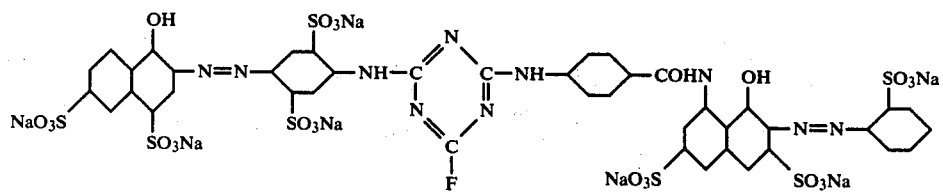

which is precipitated with sodium chloride, isolated and then washed and dried. It is a dark red powder which gives a red solution in water.

Dyestuffs with similar properties are obtained when the primary condensation product of 2,4,6-trifluoro-1,3,5-triazine and 1,4-diaminobenzene-2,5-disulphonic acid is condensed, in accordance with the instructions of Example 5, with equivalent parts of the aminoazo dyestuffs listed in column 2 of Table 5 which follows, and is subsequently combined with the coupling components, listed in column 3, to give dyestuffs.

TABLE 5

| No. | Aminoazo dyestuff | Coupling component | Colour shade on cellulose |
|---|---|---|---|
| 1 | 1-Aminobenzene-2-sulphonic acid ⟶ 2-acetylamino-5-hydroxynaphthalene-3-sulphonic acid (saponified) | 1-Ethyl-3-sulphomethyl-4-methyl-6-hydroxy-2-pyridone | Orange |
| 2 | 1-Amino-3-acetylaminobenzene-6-sulphonic acid ⟶ 1-(2′,5′-dichloro-4′-sulphophenyl)-3-methyl-5-pyrazolone (saponified) | 1-Ethyl-3-sulphomethyl-4-methyl-6-hydroxy-2-pyridone | Yellow |
| 3 | 1-Amino-3-acetylaminobenzene-6-sulphonic acid ⟶ 1-hydroxynaphthalene-3,6-disulphonic acid (saponified) | 2-Hydroxynaphthalene-3,6-disulphonic acid | Orange |
| 4 | SO₃H–⟨⟩–N=N–⟨⟩(H₂N,OH,HO₃S)–N=N–⟨⟩(SO₃H,NH₂)–SO₃H | 1-(4′-Sulphophenyl)-3-methyl-5-pyrazolone | Green |

DYEING INSTRUCTIONS I 2 parts of the dyestuff obtained according to Example 1 are dissolved in 100 parts of water with addition of 0.5 parts of sodium m-nitrobenzenesulphonate. A cotton fabric is impregnated with the resulting solution so that its weight increases by 75%, and is then dried.

The fabric is then impregnated with a solution, at 20° C., which contains 5 grams of sodium hydroxide and 300 grams of sodium chloride per liter and is squeezed off to 75% weight pick-up, and the dyeing is steamed for 30 seconds at 100° to 101° C., rinsed, soaped for quarter of an hour in an 0.3% strength boiling solution of a non-ionic detergent, rinsed and dried.

DYEING INSTRUCTION II 2 parts of the dyestuff obtainable according to Example 1 are dissolved in 100 parts of water.

The solution is added to 1,900 parts of cold water, 60 parts of sodium chloride are added and 100 parts of a cotton fabric are introduced into this dyebath.

The temperature is raised to 40° C. and after 30 minutes 40 parts of calcined sodium carbonate and a further 60 parts of sodium chloride are added. The temperature is kept at 40° C. for 30 minutes and the dyeing is then rinsed, soaped for 15 minutes in an 0.3% strength boiling solution of a non-ionic detergent, rinsed and dried.

What we claim is:

1. Dyestuffs of the formula

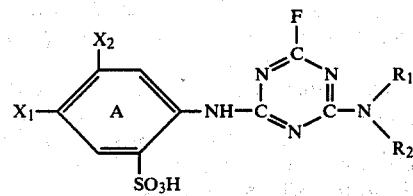

(1)

wherein $R_1$ is hydrogen or a low-molecular alkyl group, $R_2$ is hydrogen, a low-molecular alkyl group, an aryl radical or the radical of an organic monoazo or polyazo dyestuff containing sulpho groups, and $R_1$ and $R_2$ together with the nitrogen atom can form a ring, $X_1$ and $X_2$ are hydrogen, a sulpho group or the —N=N—K radical, wherein K is the radical of a coupling component and, if one X is the —N=N—K radical, the other X is a sulpho group, and the benzene ring A can contain further substituents.

2. Dyestuffs according to claim 1, wherein $X_1$ and $X_2$ are hydrogen or a sulpho group and $R_2$ is the radical of a dyestuff, containing sulpho groups, of the monoazo or polyazo series.

3. Dyestuffs according to claim 1, wherein one X is a sulpho group, the other X is the —N=N—K radical, $R_1$ is hydrogen or a low-molecular alkyl group and $R_2$ is hydrogen, a low-molecular alkyl group or an aryl radical, and $R_1$ and $R_2$ together with the nitrogen atom can form a ring with at most 6 carbon atoms, which can be interrupted by further hetero-atoms, such as oxygen or sulphur.

4. Dyestuffs according to claim 1, wherein $X_1$ is hydrogen and $X_2$ is hydrogen or a sulpho group, $R_1$ is hydrogen or methyl and $R_2$ is an azo dyestuff radical.

5. Dyestuffs according to claim 1, 2 or 4 wherein $X_1$ and $X_2$ are hydrogen.

6. Dyestuffs according to claim 3, wherein K is the radical of a coupling component of the benzene or naphthalene series or of the heterocyclic series.

7. Dyestuffs according to claim 6, wherein K is the radical of an aminonaphtholsulphonic acid.

8. Dyestuffs according to claim 6, wherein K is the radical of a coupling component of the pyrazolone, 6-hydroxypyridone, diaminopyridine or triaminopyridine series.

9. Process for the manufacture of dyestuffs of the formula

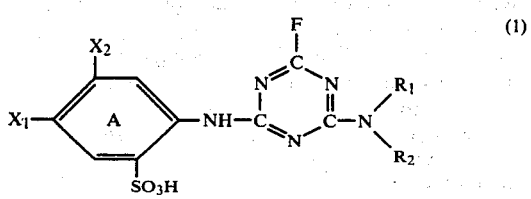

(1)

wherein $R_1$ is hydrogen or a low-molecular alkyl group, $R_2$ is hydrogen, a low-molecular alkyl group, an aryl radical or the radical of an organic monoazo or polyazo dyestuff containing sulpho groups, and $R_1$ and $R_2$ together with the nitrogen atom can form a ring, $X_1$ and $X_2$ are hydrogen, a sulpho group or the —N=N—K radical, wherein K is the radical of a coupling component and, if one X is the —N=N—K radical, the other X is a sulpho group, and the benzene ring A can contain further substituents, characterised in that an amine of the formula

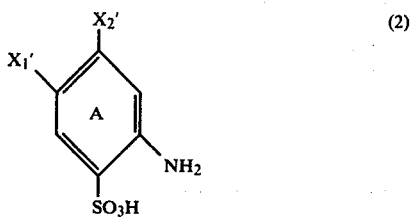

(2)

wherein $X_1'$ and $X_2'$ are hydrogen, a primary amino group or a sulpho group and if one X' is an amino group, the other X' is a sulpho group, is reacted with 2,4,6-trifluoro-1,3,5-triazine, the resulting condensation product is subsequently condensed with a compound of the formula

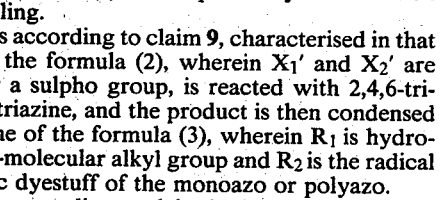

(3)

wherein $R_1$ is hydrogen or a low-molecular alkyl group and $R_2$ is hydrogen, a low-molecular alkyl group, an aryl radical or the radical of an organic dyestuff containing sulpho groups and the manufacture of the dyestuff of the formula (1) is completed by diazotisation and/or coupling.

10. Process according to claim 9, characterised in that an amine of the formula (2), wherein $X_1'$ and $X_2'$ are hydrogen or a sulpho group, is reacted with 2,4,6-trifluoro-1,3,5-triazine, and the product is then condensed with an amine of the formula (3), wherein $R_1$ is hydrogen or a low-molecular alkyl group and $R_2$ is the radical of an organic dyestuff of the monoazo or polyazo.

11. Process according to claim 9, characterised in that an amine of the formula (2), wherein $X_1'$ and $X_2'$ are hydrogen or a sulpho group, is condensed with 2,4,6-trifluoro-1,3,5-triazine, the resulting intermediate product is subsequently condensed with a diaminobenzene compound of the formula (3), and the dyestuff of the formula (1) is produced by diazotising the above compound and coupling with a coupling component of the formula K—H, wherein K is the radical of a coupling component of the benzene or naphthalene series or of the heterocyclic series.

12. Process according to claim 11, characterised in that an aminonaphtholsulphonic acid is used as the coupling component of the formula K—H.

13. Process according to claim 11, characterised in that a coupling component of the pyrazolone, 6-hydroxypyridone, diaminopyridine or triaminopyridine series is used as the coupling component of the formula K—H.

14. Process according to claim 9, characterised in that a diamine of the formula (2), wherein one X' is a primary amino group and the other X' is a sulpho group, is reacted with 2,4,6-trifluoro-1,3,5-triazine, the product is then condensed with an amine of the formula (3), wherein $R_1$ is hydrogen or a low-molecular alkyl group, $R_2$ is hydrogen, a low-molecular alkyl group or an aryl radical and $R_1$ and $R_2$ together with the nitrogen atom can form a ring with at most 6 carbon atoms, which can be interrupted by further hetero-atoms, such as oxygen or sulphur, and finally the dyestuff of the formula (1) is produced by diazotising the primary amino group and coupling with a coupling component K—H.

15. Process according to claim 14, characterised in that a coupling component of the benzene series or naphthalene series or of the heterocyclic series is used as the coupling component of the formula K—H.

16. Process according to claim 15, characterised in that an aminonaphtholsulphonic acid is used as the coupling component of the formula K—H.

17. Process according to claim 15, characterised in that a coupling component of the pyrazolone, 6-hydroxypyridone, diaminopyridine or triaminopyridine series is used as the coupling component of the formula K—H.

18. Process according to claim 9, characterised in that an amine of the formula (2), wherein $X_1'$ and $X_2'$ is hydrogen or a sulpho group, is reacted with 2,4,6-trifluoro-1,3,5-triazine, the resulting condensation product is subsequently condensed with a compound of the formula (3), wherein $R_1$ is hydrogen or a low-molecular alkyl group and $R_2$ is the radical of a coupling component of the naphthalene series or of the heterocyclic series, and thereafter the dyestuff of the formula (1) is produced by coupling with a diazotised primary aromatic amine of the benzene or naphthalene series.

19. Process according to claim 18, characterised in that an aminonaphtholsulphonic acid or an aminopyrazolone is used as the compound of the formula (3).

20. Process according to claim 18 or 19, characterised in that a diazotised aminobenzenemonosulphonic acid or -disulphonic acid or a diazotised aminonaphthalenemonosulphonic acid, -disulphonic acid or -trisulphonic acid is used for coupling.

21. Process according to claim 9, characterised in that starting materials of the formulae (2) and (3), wherein one X' is a sulpho group and the other X' is the —N=N—K radical, $R_1$ is hydrogen or a low-molecular alkyl group and $R_2$ is hydrogen, a low-molecular alkyl group or an aryl radical and $R_1$ and $R_2$ together with the nitrogen atom can form a ring with at most 6 carbon atoms, which can be interrupted by further heteroatoms, such as oxygen or sulphur, are used.

22. Process according to claim 9, characterised in that starting materials of the formulae (2) and (3), wherein $X_1'$ is hydrogen and $X_2'$ is hydrogen or a sulpho group, $R_1$ is hydrogen or methyl and $R_2$ is an azo dyestuff radical, metal complex dyestuff radical or phthalocyanine dyestuff radical, are used.

23. Process according to claim 9, characterised in that starting materials of the formula (2), wherein $X_1$ and $X_2$ are hydrogen, are used.

24. Process according to claim 9, characterised in that starting materials of the formulae (2) and (3), wherein $X_1'$ and $X_2'$ are hydrogen or a sulpho group and $R_2$ is the radical of a dyestuff, containing sulpho groups, of the monoazo or polyazo series, are used.

* * * * *